(12) United States Patent
Moura Bordado et al.

(10) Patent No.: US 9,688,806 B2
(45) Date of Patent: Jun. 27, 2017

(54) TWO-COMPONENT NATURAL POLYMERIC WATER-BASED GLUES, OBTAINED FROM DERIVATIVES OF CORK

(71) Applicants: CORK SUPPLY PORTUGAL, S.A., São Paio de Oleiros (PT); INSTITUTO SUPERIOR TÉCNICO, Lisbon (PT)

(72) Inventors: João Carlos Moura Bordado, Lisbon (PT); Elisabete Ribeiro Silva, Lisbon (PT); Rui Miguel Galhano Dos Santos Lopes, Lisbon (PT); Maria Margarida Pires Dos Santos Mateus, Lisbon (PT); Ana Cristina De Avelar Lopes Cardoso Mesquita, S. Paio de Oleiros (PT); Maria Do Rosário Melo Costa, S. Paio de Oleiros (PT)

(73) Assignees: CORK SUPPLY PORTUGAL, S.A., São Paio de Oleiros (PT); INSTITUTO SUPERIOR TÉCNICO, Lisbon (PT)

( * ) Notice: Subject to any disclaimer, the term of this patent is extended or adjusted under 35 U.S.C. 154(b) by 0 days.

(21) Appl. No.: 14/917,037

(22) PCT Filed: Sep. 2, 2014

(86) PCT No.: PCT/PT2014/000058
§ 371 (c)(1),
(2) Date: Mar. 7, 2016

(87) PCT Pub. No.: WO2015/034383
PCT Pub. Date: Mar. 12, 2015

(65) Prior Publication Data
US 2016/0215086 A1     Jul. 28, 2016

(30) Foreign Application Priority Data
Sep. 5, 2013 (PT) .......................... 107143

(51) Int. Cl.
*C08G 18/70* (2006.01)
*C08H 99/00* (2010.01)
(Continued)

(52) U.S. Cl.
CPC ..... *C08G 18/6492* (2013.01); *C08G 18/0866* (2013.01); *C08G 18/70* (2013.01);
(Continued)

(58) Field of Classification Search
CPC   C08G 18/6492; C08G 18/0866; C08G 18/70; C08G 18/706; C08H 99/00;
(Continued)

(56) References Cited

FOREIGN PATENT DOCUMENTS

| FR | PT 82239 B | * | 6/1992 | ........... F16D 65/567 |
| FR | EP 2583988 A1 | * | 4/2013 | ............. C08G 18/10 |

(Continued)

OTHER PUBLICATIONS

Cork: Properties, capabilities and applications. S.P.Silva, M.A . . . Sabino, E.M. Fernandes, V.M. Correlo, L.F. Boesel and R.L.Reis. 2005 Institute of Materials, Minerals and Mining and ASM International.

*Primary Examiner* — Kelechi Egwim
(74) *Attorney, Agent, or Firm* — Mark M. Friedman (57) ABSTRACT

The present invention is related to a new method to produce natural water-based glues made of two components, designed to glue lignocellulosic surfaces, mainly cork and wood. The mentioned process comprises the extraction of the aqueous phase of a mixture resulting from liquefying cork dust and/or cork granules, process that is commonly referred to as depolimerization process of cork; evaporation of the aqueous phase, therefore obtaining a first component consisting of a gel composed by the soluble components of the liquefying mixture; mixing and homogenizing of this gel with the second component that consists of a curing aliphatic (Continued)

compound; and, optionally, addition and mixture to "cork dust" to the previously mentioned mix.

17 Claims, 3 Drawing Sheets

(51) Int. Cl.
    *C08L 97/02*     (2006.01)
    *C09J 175/04*     (2006.01)
    *C09J 199/00*     (2006.01)
    *C08G 18/64*     (2006.01)
    *C09J 197/00*     (2006.01)
    *C08L 97/00*     (2006.01)
    *C08G 18/08*     (2006.01)

(52) U.S. Cl.
    CPC .......... *C08G 18/706* (2013.01); *C08H 99/00* (2013.01); *C08L 97/007* (2013.01); *C08L 97/02* (2013.01); *C09J 175/04* (2013.01); *C09J 197/007* (2013.01); *C09J 199/00* (2013.01)

(58) Field of Classification Search
    CPC ....... C08L 97/007; C08L 97/02; C09J 175/04; C09J 197/007; C09J 199/00
    USPC ...................................... 524/839; 264/37.29
    See application file for complete search history.

(56) References Cited

FOREIGN PATENT DOCUMENTS

| | | | |
|---|---|---|---|
| PT | 88239 B | 8/1990 | |
| PT | WO 2010020903 A1 * | 2/2010 | ......... C08G 18/6484 |
| WO | 2012/150043 A1 | 11/2012 | |
| WO | 2012/150043 A8 | 11/2012 | |

* cited by examiner

TWO-COMPONENT NATURAL POLYMERIC WATER-BASED GLUES, OBTAINED FROM DERIVATIVES OF CORK

FIELD OF THE INVENTION

The current invention refers to a new process of producing two-component glues from natural materials, supported by adopting a liquefying method on industrial cork residues, namely cork dust, cork granules or a combination thereof.

BACKGROUND OF THE INVENTION

The environmental impact of residues resulting from industrial activity has been a concern to the society. Specifically, concerning the cork industry, relevant on the Mediterranean and specifically in the Portuguese economies, the last being world leader in cork production, accounting for circa 80% of world production, a relevant production of industrial residues is observed. As an example, cork stoppers production, the more relevant of the cork industrial sector, only uses about 25% of the original raw material. These residues or wastes are classified essentially based on granulometry, density and moisture, parameters that depend on the source of the materials along the manufacturing of commercial cork. An important amount of these wastes are granules used on a variety applications, mainly composite materials, namely cork/rubber, among others, such as component of low density sandwich materials used for aerospace applications, thermoplastics/cork agglomerates, agglomerated wine closures, cork composites, etc. On the other hand, the transforming industry generates a residue considered problematic, obtained across multiple production phases, including granulation, that is, value-added operation of residues to manufacture alternative cork based wine closures, which is an important fraction of the total amount of wastes with no commercial value, this is the so called "cork dust" (Cork Supply, 2010; S. P. Silva, M. A. Sabino, E. M. Fernandas, V. M. Correlo, L. F. Boesel, R. L. Reis, International Materials Reviews, 50 (6), p. 345, 2005).

The "cork dust" as the name suggests, includes small size particles, usually a size too small (<0.5 mm) for any possible reuse, due to its high surface. According to the Portuguese standard (ISO 633:2011) it has dimensions below 0.25 mm (L. Gil, Biomass & Bioenergy 13 (1-2), p. 59, 1997). Even when used for agglomerates, inclusion of the dust is only possible under small amounts, therefore not incorporating significant volumes compared to the production. Moreover, not only cork dust but also other residues of this industry are recorded as industrial residues (LER 03 01 99) therefore their accommodation is identified as potentially impacting environmentally. Association of the District of Aveiro (L. Cabral and Gil, "Multi-sectorial Study in the Area of the Environment", 2000), in their study revealed that the "cork dust" may be responsible for geomorphological changes checked in the municipality of Santa Maria da Feira as a result of its continuous pouring.

The "cork dust" has been classified according to its source step in the transformation process of cork. In example 1 are compiled some of these types of "cork dust".

Several efforts have been made to reuse the "cork dust". Currently it is mostly applied as fuel for burning in furnaces either in the cork industry or even in the ceramic industry. This is due to the fact that it presents a high calorific value, which is between 20.6 and 22.2 MJ/kg (ASTM D1989). Other applications involve their use as a cargo agent, for example mixed with glues, in order to increase the quality of composites, in the production of linoleum or as a source of chemicals (extractives). The high interest of the use of Cork in the most diverse forms and applications is associated with the combination of their peculiar properties. Among others, one can mention their high friction coefficient, resilience, permeability to liquids, low thermal conductivity, low density, high absorption energy, excellent insulating and hypoallergenic properties (L. Gil, Biomass & Bioenergy 13 (1-2), p. 59, 1997; E. M. Fernandes, V. M. Correlo, J. a. M. Chagas, J. F. Mano, R.: Reis, Composites Science and Technology 70 (16), p. 2310, 2010).

These properties are not only associated with their structure but also to chemical composition. Its structure was one of the first that Robert Hooke (1635-1703) observed using an optical microscope. He has identified it as presenting an alveolar structure similar to a monolith, defined by cellular walls that form closed polyhedral cells (M. A. Fortes, M. E. Rosa, H. Pereira, A Cortica, IST Press, 2004).

The Cork's chemical composition is on average constituted by: 45% suberin, 27% lignin, 12% polysaccharides, 6% waxy substances, and 6% tannins (APCOR, Portuguese Cork Association).

It is also worth mentioning that often the Cork as a natural material is included in the group of lignocellulosic materials, despite being chemically and structurally distinct, leading imperatively to results and/or different technological alternatives for their reuse. In order to clarify and expose the alternative followed and described in this patent, additional comparisons with alternatives used in lignocellulosic materials are included.

With regard to the search for innovative alternatives for the reuse of residues of natural sources, there has been in recent decades a particular interest in exploring via chemical extraction and/or reactional conversion of potential compounds included in the chemical composition of these renewable natural sources.

From all the lignocellulosic materials, the wood is the one most similar to the cork in terms of chemical composition. It is also one of the most studied in terms of its liquefaction and subsequent application in various formulations (Pan H., Renewable and Sustainable Energy Reviews 15 (7) p. 3454, 2011).

The cork in particular has revealed some potential as a source of polyols for formulations (S. P. Silva, M. A. Sabino, E. M. Fernandes, V. M. Correlo, Boesel, R. L, Reis, International Materials Reviews 50 (6) 345, 2005).

On the other hand, focus was given from early times to the reuse of "cork dust" due to its power of auto-adhesivety. Luis M. C. C. Gil (PT Patent n° 88239, Agosto de 1988) proposed their reuse through the adhesive properties and/or peculiar binders of some of its components. In this invention, the author has developed a process for producing agglomerated cork dust, through a pre-depolymerization suberin and subsequent polymerization by pressing and heating. In this final step of the polymerization process of chemical constituents of agglutination is promoted (waxes and the suberin monomers), by allowing the agglutination of cork dust.

Several methods have been proposed and/or developed in order to obtain a liquid phase of polyols from a solid material. These are mostly suitable for various types of natural-based materials, such as lignocellulosic. However, these methods present procedural limitations, or are associated with some complexity or do not allow the maximization of liquefied materials into value added products such as "cork dust".

A good example of a method for obtaining a polyols liquid is referred to be the process used in the patented work by G. Alexandro, C. C. Pinto, J. Joaquim, P. Neto and Carlos, patent application WO 2010/020903, Fevereiro, 2010. These inventors developed a liquefaction method of various natural materials, mostly from forestall origin, agricultural residues or from the food industry source, for the production of a liquid polyols. The authors also include in particular materials such as the "cork dust" and wood. Their method consists in resorting to oxypropilation as a reaction process of liquefaction, which is based on two essential steps: a) pre-treatment or pre-functionalization of the substrate (natural material) with an alkaline alcoholic solution for about 30 to 90 minutes, which will promote a high conversion obtaining a residual substrate of 3% residual after liquefaction; b) liquefaction of the substrate through the reaction of the previous mixture with propylene oxide (oxypropilation) in a range of temperatures between 150-200° C. and under pressure. In the particular case of "cork dust", maximum pressures of 10-20 bar were used.

Although this method suggests similar steps to the method proposed on this patent, this is however significantly distinct. The process for obtaining polyols claimed in this patent was adapted from the method proposed by M. Kunaver, N. Cuk, E. Ukaityte, F. Kovacs, S. Opresnik and T. Katrasnik (WO/2012150043). The method here proposed allows the attainment of a high conversion upon liquefaction, avoiding the need to perform the reaction process under pressure. This novel procedure also allows the operation to be conducted at a lower range of temperatures (150-170° C.), as well as a significant reduction of reaction time (15 min) with higher conversions (95 percent). These points allow a significant optimization not only in terms of the procedure cost, but as well as in terms of energetics. The process claimed in this patent is distinguished by obtaining a polyol liquid through extraction using an extracting agent, such as water. That in turn allows one to obtain two value-added products: a mixture of polyols of higher purity which can be used not only in the suggested applications, in the patent application WO/2010/020903, but also in other applications/products that require a higher purity of its components. They can also be applied in the development of new ecological glues that use this source of polyols. This novel procedure also allows the separation of an organic phase, or liquefied cellulosic materials similar to the one obtained by liquefaction of wood, which presents an attractive fuel power with possible applications in in combustion systems such as engines.

Other methods that allow one to obtain the composition of polyols through natural materials have been proposed, but none of them proved to be suitable for "cork dust". Between these is the method proposed in the patent application WO 2004/011518, February 2004. Succinctly, this patent describes a method for producing a composite of polyols by liquefaction of waste obtained from crops (rice, oats, corn, wheat, apple pulp, sunflowers, beet pulp). This method beyond the kind of natural substrate it differs from the one here mentioned essentially in terms of the reactional conditions, among them: the catalyst type and reaction time. The potential of the method here proposed lies mainly in the shortest reaction time for similar conversions. It is also suitable for processing "cork dust", and in turn, taking as an example of their application as a gluing component of lignocellulosic materials, curing times and temperatures obtained are lower than those suggested in the patent application WO 2004/011518.

In relation to suggested applications for this type of liquefied materials, are generally found as components of polymer formulations. Nonetheless with limited reference to any adhesive capacity, with some exceptions, such as, the previously mentioned patent application, patent application WO 2004/011518. Such adhesive properties are however easily found when using synthetic components, such as those proposed in U.S. Pat. No. 5,932,680, August 1999. Briefly, this patent describes the possibility of the use of poly-isocyanates and polybutanodiol in the formulation of polymers and pre-polymers with properties that enable their use as adhesives after application of heat.

There are other documents that refer to the use of reagents or in the same chemical family that present in the composition of elastomers, adhesives, adhesives and ligands, one should mention in particular the US documents US 2001/3509, US 2003/0212227, US 2004/122176, US 2005/0010013 that offer formulations for polymers and pre-polymers which can be used as surfaces stickers, slabs, glass, ceramics, lignocellulosic materials, among others. Additionally, these adhesive abilities referred in these patented works are not suitable for the preparation of particle clusters. There are however some other methods that offer synthetic formulations for the gluing of lignocellulosic materials particles in the form of clusters has been proposed by C. Phanopoulos, R. H. Carr, G. Pans, patent application US 2011/0210466, September 2011.

Additionally, natural components, in particular from cork derivatives have been coupled to these synthetic origin adhesives and/or other polymer-based matrices (E. M. Fernandes, V. M. Correlo, J. a. M. Chagas, J. F. Mano, R.: Reis, Composites Science and Technology 70 (16), p. 2310, 2010), in order to facilitate the improvements in the properties of the resulting composites. The positive effect of the inclusion of cork particles in polymeric matrices, in particular with adhesive properties (glues), is associated to their peculiar properties. On one hand, cork is a material that provides thermic and sound insolation, and additionally it is also an excellent vibration absorber as a result of its closed cell structure containing air. This structure confers to it the ability to deform when subject to stress forces, such as impact or compression, acting as a buffer mode, i.e. an energy absorber, associated to the stress forces. As a general rule, the synthetic glues with good adhesive properties and when cured, are brittle and as such are associated with a deterioration of their resiliency properties when subjected to such stress forces, promoting the appearance of fissures. By this reason materials such as cork particles have been included in adhesive formulations, as proposed by V. Bonacini (Patent EP 1 347 107, November 2001). On the other hand, and as mentioned on this patent, cork particles promote equally the cohesion of the components that make up the polymer matrix, not only by filling existing porosity, but essentially by the increase of surface area that promotes a more effective mechanical connection of the various components of the array, and may also act as load for the thickening of the formulation. Additionally, his power of auto-adhesively (waxes, and suberin monomers as hinders) also offers the ability to act as a binding agent of compatible components by a chemical bond. One should note that this ability depends on the particle size and the interfacial adhesion between the matrix and the cork. Commonly, this capability is promoted by the glues heating (hot-melt adhesives).

SUMMARY OF THE INVENTION

The present invention is related to a new production method of natural-based glues, with an adhesive power potential (maximum cutting forces are 9.4×10-3 N/m2 when gluing Cork surfaces).

The formulations are developed through acid liquefaction of lignocellulosic derivatives, in particular cork, from where one extracts two phases: a polyols liquid, which is one of the components in the formulation of glues in conjunction with an aliphatic isocyanate component (with preferentially levels of NCO in the rage of 15-25%), water and cork dust; and an organic phase, that presents an attractive economic and environmental nature as fuel, this can be used as an alternative to similar compounds obtained by petrochemical sources. The formulated glues are suitable for the gluing of lignocellulosic materials surfaces, such as cork and/or wood at room temperature (15-30° C.). On the other hand, they are also suitable for the preparation of agglomerated cork at low temperatures (50-80° C.).

DETAILED DESCRIPTION OF THE INVENTION

Based on what has been explained, this invention aims at solving the technical issues not solved or only partially solved by prior knowledge, namely applying a modified liquefying process, this being a thermochemical conversion process using organic solvent agents, from cork based materials, from which there is the extraction of polyol compounds used for the formulation of ecological glues used for a range of applications, such as gluing lignocellulosic materials.

The term "liquefaction" according to the present invention, should be understood as a thermochemical process related to the depolymerization of a solid material, with concomitant dissolution in a solvent.

The current formulations of glues claim their applicability in a high diversity of systems. These include the surface adhesion of lignocellulosic materials and/or the clogging of the material pores. This results in the covering of materials such as the Cork and wood. On the other hand, the process allows for obtaining two intermediate products, an aqueous solution (polyol liquid) and an organic phase (non soluble components). These products show economical as well as environmental potential, both of which can be used as an alternative to similar compounds obtained by petrochemical sources. The organic phase can be used as fuel in combustion systems. The phase which contains polyols can be used in the formulation of glues, as well as in the formulation and synthesis of polymers, such as polyesters and polyurethanes, their application can be further extended to several sectors, such as: food, pharmaceutical, furniture, civil engineering, automobile and polymer industries.

For obtaining new formulations of glues claimed in this document it is necessary the use of an aliphatic cross linker of isocyanate, which as very useful in combination polymers from lignocellulosic and cellulosic nature to achieve a stronger binding between lignocellulosic surfaces upon the gluing process. Examples of these cross-linkers are the DESMODUR DA-L and DESMODUR DN, used in illustrative examples of this patent. These compounds penetrate in lignocellulosic network of polyols, acting moderately at room temperature, revealing an excellent compatibility with the hydroxyl groups present in lignocellulosic-based polymers. This promotes the achievement of natural glues with very promising properties through a simple and low-cost process.

The process here claimed is adequate to the gluing of lignocellulosic materials, surfaces and clusters of natural base such as cork-based. Taking into account what was mentioned above, it should be noted that the developed formulations include the addition of cork particles (dust<250 μm), as promoter of the gluing mechanical properties, but also as an adherence promoter of the glue to the gluing surface, essentially when this is also made of Cork. These particles act not only as load, but also as a mechanic ligand in filling the porosity inherent to the surface. Regarding the glue formulation, and taking in consideration that it is obtained from cork's own components, the interfacial adhesion of these particles is favoured, ensuring the uniformity of its mechanical properties. One should note that the novel process here claimed in order to obtain adhesives, and in the particular case of application in the preparation of compound clusters of cork, it allows the gluing process to occur at relatively low temperatures, 50-80° C. It is also worth to mention that the viscosities obtained in formulated glues are very close to water, preferably in the range of 1 to 5 MPa·s, as a result of high water contents (>90%), which favours the mixing operation with the corks granules. This allows a reduction of the economic effort in using the glue, and also does not avoid the consequent appearance of pores, due to the glue contraction. The latter would provoke the appearance of air bubbles that would affect the coarse grain properties.

The claimed invention presents as potential markets:
Construction sector, production of panels for acoustic and thermal insulation.
The footwear sector as soles, heels and insoles.
Current market Sector of clusters and paintings.
Cork Industry for gluing corks, cork discs or panels.
In the same industry in colmating natural stoppers.
In conclusion, the added value of the invention can be listed as:
Obtaining a natural glue without solvents in its composition and adhesive power at room temperature;
Obtaining a versatile natural glue that can be applied in lignocellulosic materials, even in the form of particles/grainy, allowing their agglomeration and formation of composites;
Obtaining a natural glue compatible with Cork particles, allowing a good interfacial adhesion, with concomitant improvement of their mechanical properties after curing (ex: ductility), with a consequent increase of its resistance and endurance to cracking when subject to stress forces;
Environmental and Economic Advantages that is a reflection from the use a waste from cork industry, as cork dust and cork granules.

The proposed method includes the extraction of an aqueous phase resulting from the fixture liquefaction, commonly referred to as cork depolymerization. This is performed using distilled water which acts as an extracting agent for the liquefied soluble components (polyols).

The resulting aqueous solution is then subjected to a controlled evaporation process in order to remove the water from the mixture leading to the formation of a gel.

Following step relates to mining the gel with distilled water, in order to adjust the water contents in the formulation together with the aliphatic cross-linking isocyanate.

This mixture is then homogenized under specific proportions, depending on the desired viscosity, as well as the desired gluing power of the resulting glue.

Before the application of the resulting glue, "cork dust" is still added to the mix followed by a new homogenization process thus leading to a better performing water-based glue formulation.

The final application of the glue is suitable to be carried out at room temperature, preferably between 15-30° C., being advisable to apply amounts between 1 and 2 L/m² in the surface. Gluing process is accomplished in a recommended interval of time within the range of 30 min to 180 min.

OBJECT OF INVENTION

To be more precise, the current invention refers to a process for preparing two-component natural polymeric water-based glues, suitable for gluing lignocellulosic surfaces, specifically cork and wood, comprising the following steps:

(a) extraction of the aqueous phase resulting from a mixture resulting from the liquefaction of cork dust and/or granules, which is usually designated by cork depolymerization.

(b) evaporation of aqueous phase to remove the water and to obtain a first component which consists of a gel composed by the soluble components of the liquefaction mixture.

(c) mixing and homogenization of the gel with a second component which consists of an aliphatic crosslinking agent in water.

and optionally (d) addition and mixture of "cork dust" to the previously formulated mixture.

Preferably, the aqueous phase obtained from step a) contains oligosaccharides and oligomers from suberin and lignin, obtained by liquid-liquid extraction from depolymerization of cork.

Normally, the evaporation at step (b) is carried out to reach a reduction of water contents above 95%, by weight.

Preferably, at step e) the two components, the gel and the cross-linking agent, prepared separately, are blended together upon-application, with a pot life between 30 minutes to 2 hours.

At step (c) the gel, containing oligosaccharides and oligomers, is commonly mixed with the cross-linking agent in a ratio, by weight, of crosslinking agent:gel from 1:6 to 4:6, preferably from 2:6 to 4:6, and with distilled water in a ratio, by weight, of distilled water:gel from 4:1 to 12:1, preferably from 4:1 to 8:1.

The aliphatic cross-linking agent is dispersible in water and with an isocyanate reactive functionality, usually with a contents of isocyanate between 5 and 25%, especially between 15 and 24%, by weight.

The two component glue obtained at step (c) has normally a water contents above 90%, by weight, and a viscosity between 1 and 10 mPa·s.

At step (d) the two component glue is mixed with "cork dust" upon application on ligno-cellulosic surfaces, with a typical pot life between 30 minutes and 2 hours.

Preferably the "cork dust" has a particle size below 0.5 mm, and is present in an amount from 0.1% to 0.6%, by weight, specially from 0.1% to 0.2%, by weight, in relation to the total weight of the mixture.

These glues are intended to be appropriate glues for gluing lignocellulosic surfaces, with a natural or synthetic structure, at room temperature, between 8 and 30° C., preferably between 15 and 30° C.

These glues are also appropriate glues for gluing ligno-cellulosic materials, under the shape of agglomerated particles, in particular of cork, allowing the formation of composed clusters, in a range of temperatures between 50 to 100° C., preferably between 50 and 80° C., under pressure for 8 to 24 hours, preferably 8 to 10 hours.

EXAMPLES

Example 1

As a first example the preparation of water-based glue and its formulation for the gluing corks top to top is described.

In a first phase one proceeded to the liquefaction process of the "cork dust" in a similar way to the one presented in the patent WO2012/150043. The classification of the "cork dusts" according to their source in the cork transformation process is presented in Table 1 (example 1).

TABLE 1

Properties of different types of cork

| Type of "Cork dust" | Volumic mass (% m/m) | Moisture contents (% m/m) | Ash contents (% m/m) | higher calorific value (MJ kg$^{-1}$) | Granulometric fraction (<0.25 mm % m/m) |
|---|---|---|---|---|---|
| A | 261 | 14 | 3.7 | 18.87 | 30.2 |
| B | 328 | 20 | 6.0 | 15.91 | 4.0 |
| C | 306 | 11 | 3.3 | 18.93 | 20.3 |
| D | 115 | 3 | 0.9 | 27.71 | 35.0 |
| E | 82 | 5 | 0.9 | 26.76 | 27.3 |
| F | 73 | 8 | 2.0 | — | 100 |
| G | 60 | 3 | 1.6 | ~29.29 | ~10 |
| H | 233 | 12 | — | — | 49.9 |

1-Adapted from L. Gil, Biomass & Bioenergy 13 (1-2), p. 59, 1997.
Where:
A. Grinding dust (pre-crushing and granulation)
B. Cleaning dust (removal of impurities)
C. Dust from particle size separation
D. Finishing dust from agglomerates panels.
E. Finishing dust from stoppers and cluster disks.
F. Finishing dust from natural cork stoppers and disks.
G. Finshing dust from cork insulating boards.
H. Fuel dust (mixtures of A, B and C)

After applying the liquefaction process, one proceeds with multiple washings of the filtered mix with distilled water. Subsequently, the resulting aqueous solution is driven to an evaporation process of the entire extracting agent, in order to obtain a gel which included the liquefied soluble constituents (polyols).

In order to obtain the glue, one proceeds to the mixture of 1.5 g of this gel with 10 ml distilled water and 0.6 g of Desmodur DA. The proportions of the components included in this glue formulation depend on the viscosity and adhesive power required for the glue. In this particular application, the values are suggested in order to obtain a preferential optimum.

Before the application of the resulting glue, 0.1 g (m/m) of "cork dust" is still added to the mixture, suffering new homogenization, leading therefore to the claimed water-based glue formulations.

The results for the cutting forces for the set A and B are of 5.7×10-3 and 7.41×10-3 N/m2, respectively. For the torsion angle the respective values were: for set A 54.3° and for set B 57.9°. Taking into account these results the claimed invention presents a high glue power for both sets.

Example 2

The formulation of natural water based glue obtained from Cork derivatives is performed under the same conditions as in the previous example.

We proceeded to the application of the claimed invention for the preparation of cork agglomerate. For this purpose, one proceeds with the mixture of 40 g of water based glue with 200 g of cork granules. The next step involved the filling cubic mold with the glue. The mold was constituted by a removable lid and bottom, presenting the following dimensions: 19.5×19.5 cm. To the previous system a compression force of 1000 psi was applied with heating (temperature of 80° C.) for about 30 min, after which it was left to cool down gradually until it reached the room temperature followed by unmolding.

Figure 1:
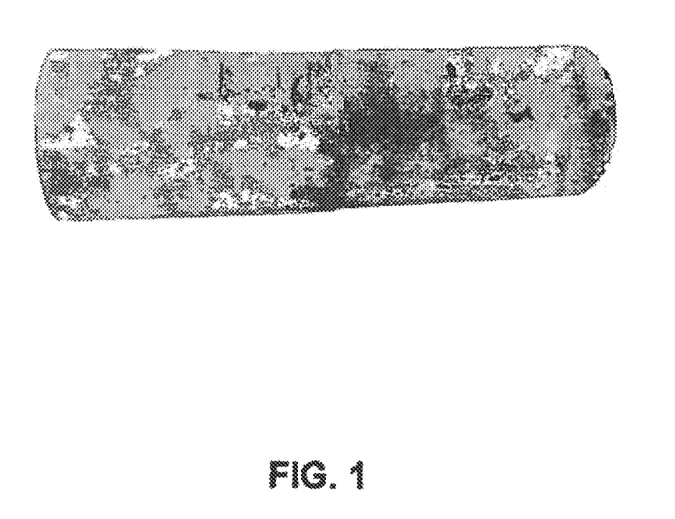
FIG. 1 illustrates two cork stoppers glued top to top by using the glue prepared according to the current invention FIG. 2 Illustrates an agglomerated cork composite obtained by gluing with natural water based glue: (a) top image with size 19.5 cm×19.5 cm; (b) detail from the side packing.
Figure 2:
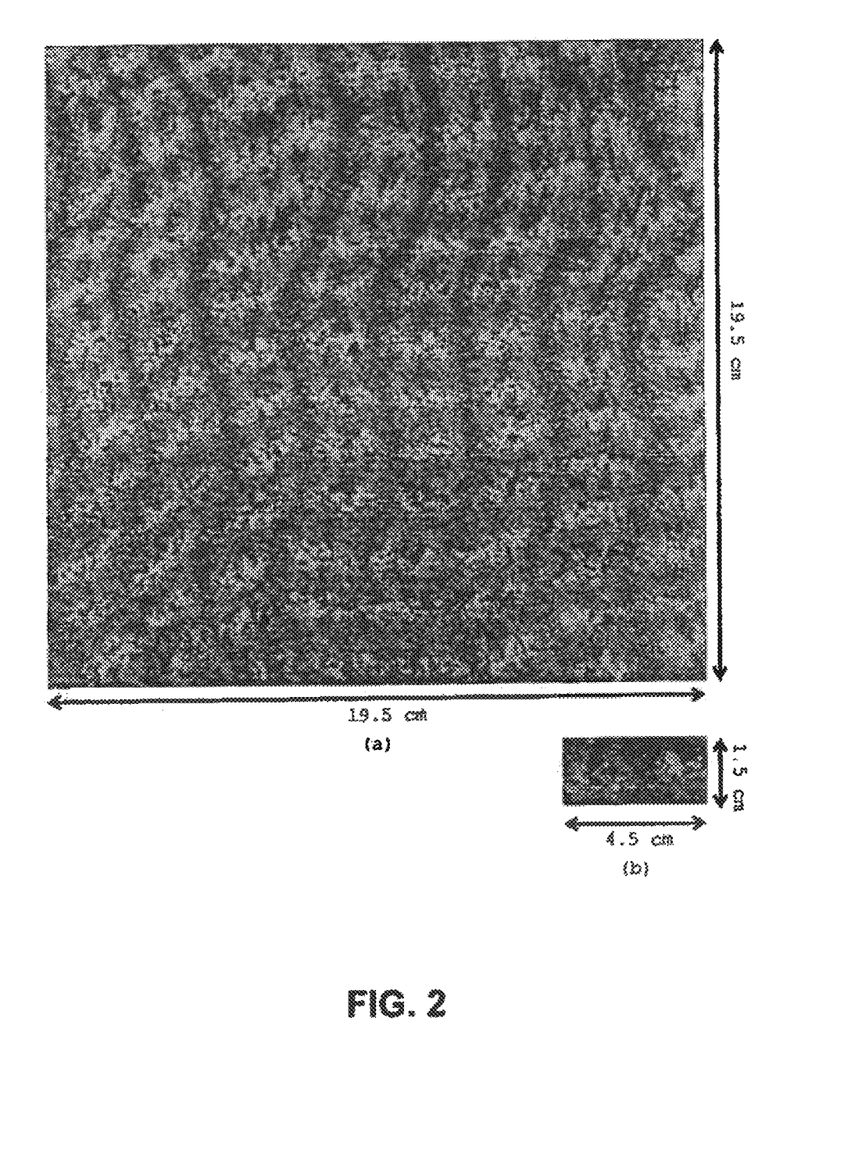

The obtained module is represented in FIG. 2.

Example 3

The formulation of natural water based glue obtained from Cork derivatives is performed by mixing 1.5 g of this gel with 10 mL of distilled water and 1 g of Desmodur DA, followed by homogenization. The proportions of the components included in this formulation are dependent on the viscosity and adhesive power required for the glue. And for this particular application, the values suggested are preferential.

Before the application of the resulting glue, it was added to the mixture 0.5 g (m/m in the mix) of "cork dust", followed by new homogenization, leading to the claimed water-based natural glue formulations.

The application of glue is held at a temperature of 25° C., by applying 1 mL on top of a wood cylinder. Optimum gluing is achieved in a time interval of 3 h. It is recommended, in order to increase the efficiency of the gluing process, a pretreatment of the wood surface in order to increase its roughness.

Figure 3:
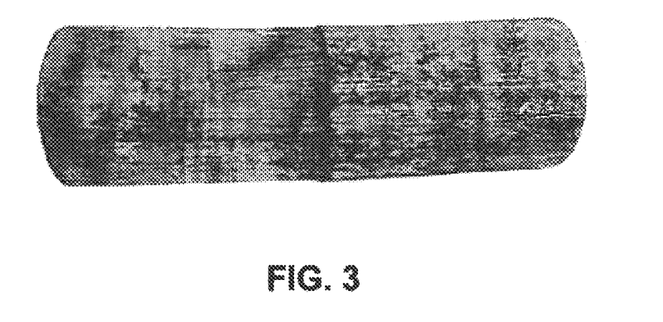
FIG. 3 Illustrates two cylindrical wood blocks glued top to top by using the glue prepared according to the current invention FIG. 4 Illustrates collated cork stoppers by using the glue prepared according to the current invention.
Figure 4:
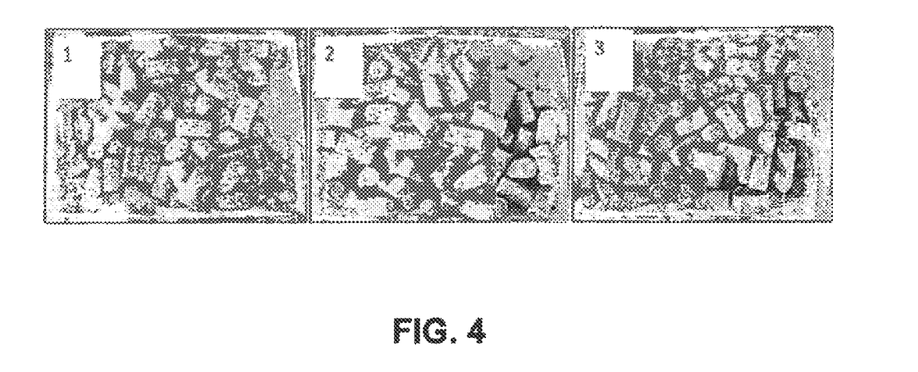

A representative image of glued cylinders top to top with the claimed water-based glue is presented in FIG. 3.

Example 4

The formulation of the glue retrieved from Cork derivatives is performed by mixing 150 g of gel with 1 L of distilled water and 60 g of Desmodur DA-L followed by homogenization.

The formulation was applied in a pilot-scale for cork colmation under the conditions presenting in table for 200 corks.

| ENSATO | Step | 1 | 2 | 3 | 4 | 5 | 6 | 7 |
|---|---|---|---|---|---|---|---|---|
| 1 | product | Glue | — | Dust | Dust | End | | |
| | volume (mL) | 150 | — | 100 | 100 | | | |
| | time (min) | 5 | 10 | 7 | 7 | | | |
| | rpm (%) | 100 | 10 | 10 | 10 | | | |
| 2 | product | Glue | Glue | Dust | Dust | End | | |
| | volume (mL) | 50 | 150 | 100 | 100 | | | |
| | time (min) | 5 | 10 | 10 | 10 | | | |
| | rpm (%) | 100 | 10 | 10 | 10 | | | |
| 3 | product | Dust | Glue | Glue | Glue | Dust | Dust | End |
| | volume (mL) | 100 | 50 | 100 | 100 | 100 | 100 | |
| | time (min) | 10 | 5 | 10 | 10 | 10 | 10 | |
| | rpm (%) | 10 | 100 | 10 | 10 | 10 | 10 | |

Similar products were obtained with this procedure to the ones existing in currant market as it is illustrated.

The invention claimed is:

1. A process for preparing two-component natural polymeric water-based glues, suitable for gluing lignocellulosic surfaces, comprising the following steps:
    (a) extraction of the aqueous phase resulting from a mixture resulting from the liquefaction of cork dust and/or granules,
    (b) evaporation of aqueous phase to remove the water and to obtain a first component which consists of a gel composed of the soluble components of the liquefaction mixture,
    (c) mixing and homogenization of the gel with a second component which consists of an aliphatic crosslinking agent in water, thereby creating a formulated mixture, and optionally
    (d) addition and mixture of cork dust to said formulated mixture.

2. The process according to claim 1, wherein the aqueous phase extracted at step (a) contains oligosaccharides and oligomers from suberin and lignin, obtained by liquid-liquid extraction from polymerization of cork.

3. The process according to claim 1, wherein the evaporation at step (b) is carried out to reach a reduction of water contents above 95%, by weight.

4. The process according to claim 1, wherein at step (c) the two components, the gel and the cross-linking agent, prepared separately, are blended together upon application, with a pot life between 30 minutes to 2 hours.

5. The process according to claim 4, wherein at step (c) the gel, containing oligosaccharides and oligomers, is mixed with the cross-linking agent in a ratio, by weight, of cross-linking agent:gel from 1:6 to 4:6, and with distilled water in a ratio, by weight, of distilled water:gel from 4:1 to 12:1.

6. The process according to claim 5, wherein the cross-linking agent is present in a ratio, by weight, from 2:6 to 4:6, and the distilled water is present in a ratio, by weight, from 4:1 to 8:1.

7. The process according to claim 1, wherein the aliphatic cross-linking agent is dispersible in water and with an isocyanate reactive functionality.

8. The process according to claim 7, wherein the aliphatic cross-linking agent has an isocyanate content between 5 and 25%, by weight.

9. The process according to claim 8, wherein the aliphatic cross-linking agent has an isocyanate content between 15 and 24%, by weight.

10. The process according to claim 1 wherein the two component glue obtained at step (c) has a water content above 90%, by weight.

11. The process according to claim 1 wherein the two component glue obtained at step (c) has a viscosity between 1 and 10 mPas.

12. The process according to claim 1 wherein at step (d) the two component glue is mixed with cork dust upon application on lignocellulosic surfaces, with a pot life between 30 minutes and 2 hours.

13. The process according to claim 12, wherein the cork dust has a particle size below 0.5 mm, and is present in an amount from 0.1% to 0.6%, by weight, in relation to the total weight of the mixture.

14. The process according to claim 13, wherein the cork dust is present in an amount from 0.1% to 0.2%, by weight, in relation to the total weight of the mixture.

15. The process according to claim 1, wherein the lignocellulosic surfaces are cork and wood.

16. The process according to claim 4, wherein the mixture occurred at room temperature.

17. The process according to claim 1, wherein the gluing temperature occurs between 15° C. and 30° C.

* * * * *